(12) United States Patent
Nubile et al.

(10) Patent No.: US 11,775,185 B2
(45) Date of Patent: Oct. 3, 2023

(54) POWER BUDGET ARBITRATION FOR MULTIPLE CONCURRENT ACCESS OPERATIONS IN A MEMORY DEVICE

(71) Applicant: Micron Technology, Inc., Boise, ID (US)

(72) Inventors: Luca Nubile, Sulmona (IT); Ali Mohammadzadeh, Mountain View, CA (US); Biagio Iorio, Avezzano (IT); Walter Di Francesco, Avezzano (IT); Yuanhang Cao, Santa Clara, CA (US); Luca De Santis, Avezzano (IT); Fumin Gu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/948,426

(22) Filed: Sep. 17, 2020

(65) Prior Publication Data

US 2022/0083241 A1 Mar. 17, 2022

(51) Int. Cl.
*G06F 3/06* (2006.01)
*G06F 9/50* (2006.01)

(52) U.S. Cl.
CPC .......... *G06F 3/0625* (2013.01); *G06F 3/0655* (2013.01); *G06F 3/0679* (2013.01); *G06F 9/505* (2013.01); *G06F 9/5094* (2013.01); *G06F 2209/5018* (2013.01)

(58) Field of Classification Search
CPC .... G06F 3/0625; G06F 3/0655; G06F 3/0679; G06F 9/505; G06F 9/5094; G06F 2209/5018; G06F 1/3225; G06F 3/0659; G06F 13/1605; G06F 1/3275; G06F 13/1673; Y02D 10/00
See application file for complete search history.

(56) References Cited

U.S. PATENT DOCUMENTS

| | | | |
|---|---|---|---|
| 9,418,712 B1* | 8/2016 | Erez | G06F 3/0688 |
| 9,874,922 B2* | 1/2018 | Varma | G06F 1/3206 |
| 10,331,193 B2* | 6/2019 | Ware | G11C 7/1066 |
| 2002/0103990 A1* | 8/2002 | Potash | G06F 9/3009 712/23 |
| 2005/0138328 A1* | 6/2005 | Moy | G06F 9/3851 712/E9.055 |
| 2008/0263341 A1* | 10/2008 | Ozer | G06F 9/3832 712/239 |
| 2012/0290864 A1* | 11/2012 | Seroff | G06F 1/3268 713/340 |
| 2019/0065089 A1* | 2/2019 | Myers | G06F 3/0625 |

* cited by examiner

*Primary Examiner* — Meng Ai T An
*Assistant Examiner* — Hsing Chun Lin
(74) *Attorney, Agent, or Firm* — Lowenstein Sandler LLP

(57) ABSTRACT

A memory device includes a plurality of memory dies, each memory die of the plurality of memory dies comprising a memory array and control logic. The control logic comprises a plurality of processing threads to execute memory access operations on the memory array concurrently, a thread selection component to identify one or more processing threads of the plurality of processing threads for a power management cycle of the associated memory die and a power management component to determine an amount of power associated with the one or more processing threads and request the amount of power during the power management cycle.

17 Claims, 9 Drawing Sheets

1

POWER BUDGET ARBITRATION FOR MULTIPLE CONCURRENT ACCESS OPERATIONS IN A MEMORY DEVICE

TECHNICAL FIELD

Embodiments of the disclosure relate generally to memory sub-systems, and more specifically, relate to power budget arbitration for multiple concurrent access operations in a memory device of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
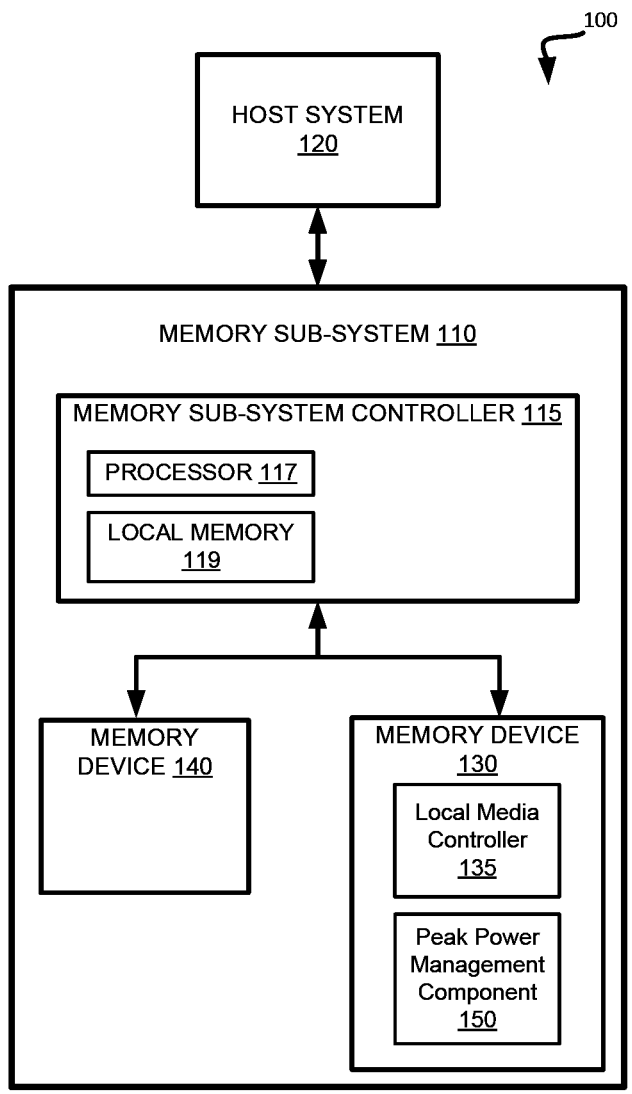
FIG. 1 illustrates an example computing system that includes a memory sub-system in accordance with some embodiments of the present disclosure.

Aspects of the present disclosure are directed to power budget arbitration for multiple concurrent access operations in a memory device of a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Control logic on the memory device includes a number of separate processing threads to perform concurrent memory access operations (e.g., read operations, program operations, and erase operations). For example, each processing thread corresponds to a respective one of the memory planes and utilizes the associated independent plane driver circuits to perform the memory access operations on the respective memory plane. As these processing threads operate independently, the power usage and requirements associated with each processing thread also varies.

The capacitive loading of three-dimensional memory is generally large and may continue to grow as process scaling continues. Various access lines, data lines and voltage nodes can be charged or discharged very quickly during sense (e.g., read or verify), program, and erase operations so that memory array access operations can meet the performance specifications that are often required to satisfy data throughput targets as might be dictated by customer requirements or industry standards, for example. For sequential read or programming, multi-plane operations are often used to increase the system throughput. As a result, a typical memory device can have a high peak current usage, which might be four to five times the average current amplitude. Thus, with such a high average market requirement of total current usage budget, it can become challenging to operate more than four memory devices concurrently, for example.

A variety of techniques have been utilized to manage power consumption of memory sub-systems containing multiple memory devices, many of which rely on a memory sub-system controller to stagger the activity of the memory devices seeking to avoid performing high power portions of access operations concurrently in more than one memory device. Further, as additional processing threads are utilized on each individual memory device (e.g., 4, 6, or 8 processing threads), these power management techniques are not adequate to account for the added complexity associated with budgeting current usage within the individual memory devices.

Aspects of the present disclosure address the above and other deficiencies by providing power budget arbitration for multiple concurrent access operations in a memory device of a memory sub-system. In one embodiment, the memory sub-system includes multiple memory devices (e.g., multiple separate dies) each including multiple processing threads configured to perform concurrent memory access operations (e.g., on corresponding memory planes of the memory device). Each memory device further includes a peak power management (PPM) component configured to perform power budget arbitration for the multiple processing threads on the respective memory device. In the embodiment, the memory sub-system employs a token-based round robin protocol, whereby each PPM component rotates (e.g., after a set number of cycles of a shared clock signal) as a holder of the token and broadcasts a quantized current budget consumed by its respective memory device during a given time period. The other PPM components on each other memory device receive this broadcast information and thus, can determine an available current budget in the memory sub-system during the time period. While holding the token, a PPM component can request a certain amount of current for its respective memory device up to the available current budget in the memory sub-system. As described in further detail below, the PPM component can employ a number of different techniques to allocate the requested current among the multiple processing threads of the respective memory device.

Advantages of this approach include, but are not limited to, an effective power management scheme for a multi-die memory sub-system where each memory die supports multiple processing threads operating concurrently. The disclosed techniques allow support for independent parallel plane access in a memory device with significantly reduced hardware resources in the memory sub-system. This approach is highly scalable as the number of processing threads increases and does not rely on external controller intervention. In addition, certain embodiments implement a separation between thread arbitration and protocol realization, which improves the efficiency of power budget arbitration. Thus, the overall performance and quality of service provided by each memory device is improved.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which includes a raw memory device 130 having control logic (e.g., local media controller 135) on the die and a controller (e.g., memory sub-system controller 115) for media management within the same memory device package. An example of a managed memory device is a managed NAND (MNAND) device.

In one embodiment, the memory device 130 includes peak power management (PPM) component 150. In one embodiment, local media controller 135 of memory device 130 includes at least a portion of PPM component 150. In such an embodiment, PPM component 150 can be implemented using hardware or as firmware, stored on memory device 130, executed by the control logic (e.g., local media controller 135) to perform the operations related to power budget arbitration for multiple concurrent access operations described herein. In some embodiments, the memory sub-system controller 115 includes at least a portion of PPM component 150. For example, the memory sub-system controller 115 can include a processor 117 (e.g., a processing device) configured to execute instructions stored in local memory 119 for performing the operations described herein.

In one embodiment PPM component 150 can manage power budget arbitration for multiple concurrent access operations in memory device 130. In one embodiment, memory sub-system 110 employs a token-based protocol, where a token rotates (e.g., in round robin fashion) among multiple PPM components of multiple memory devices (e.g., after a set number of cycles of a shared clock signal). When PPM component 150 holds the token, it can determine the power (e.g., current) requested by multiple processing threads (e.g., implemented by local media controller 135) of memory device 130, select one or more of those multiple processing threads based on an available power budget in the memory sub-system, request that power from a shared current source in memory sub-system 110, and allocate the requested power to the selected processing threads. PPM 150 can further broadcast a quantized current budget consumed by memory device 130 during a given time period, so that the other PPM components in memory sub-system 110 are aware of the available power budget. Further details with regards to the operations of PPM component 150 are described below.

Figure 2:
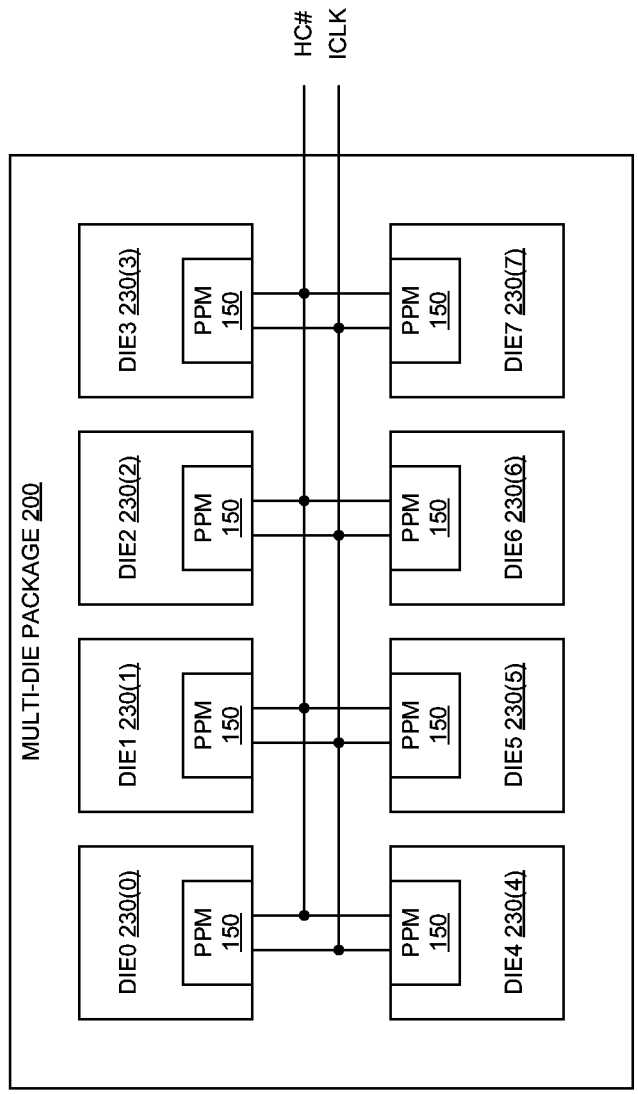
FIG. 2 is a block diagram illustrating a multi-die package with multiple memory dies in a memory sub-system in accordance with some embodiments of the present disclosure.

FIG. 2 is a block diagram illustrating a multi-die package with multiple memory dies in a memory sub-system in accordance with some embodiments of the present disclosure. As illustrated, multi-die package 200 includes either memory dies 230(0)-230(7). In other embodiments, however, multi-die package 200 can include some other number of memory dies, such as additional or fewer memory dies. In one embodiment, memory dies 230(0)-230(7) share a clock signal ICLK which is received via a clock signal line. Memory dies 230(0)-230(7) can be selectively enabled in response to a chip enable signal (e.g. via a control link), and can communicate over a separate I/O bus. In addition, a peak current magnitude indicator signal HC # is commonly shared between the memory dies 230(0)-230(7). The peak current magnitude indicator signal HC # can be normally pulled to a particular state (e.g., pulled high). In one embodiment, each of memory dies 230(0)-230(7) includes an instance of PPM component 150, which receives both the clock signal ICLK and the peak current magnitude indicator signal HC #.

In one embodiment, a token-based protocol is used where a token cycles through each of the memory dies 230(0)-230(7) for determining and broadcasting expected peak current magnitude, even though some of the memory dies 230(0)-230(7) might be disabled in response to their respective chip enable signal. The period of time during which a given PPM component 150 holds this token (e.g. a certain number of cycles of clock signal ICLK) can be referred to herein as a power management cycle of the associated memory die. At the end of the power management cycle, the token is passed to a next memory die in sequence. Eventually the token is received again by the same PPM component 150 which signals the beginning of a new power management cycle for the associated memory die. In one embodiment, the encoded value for the lowest expected peak current magnitude is configured such that each of its digits correspond to the normal logic level of the peak current magnitude indicator signal HC # where the disabled dies do not transition the peak current magnitude indicator signal HC #. In other embodiments, however, the memory dies can be configured, when otherwise disabled in response to their respective chip enable signal, to drive transitions of the peak current magnitude indicator signal HC # to indicate the encoded value for the lowest expected peak current magnitude upon being designated.

When a given PPM component 150 holds the token, it can determine the peak current magnitude for the respective one of memory die 230(0)-230(7), which can be attributable to one or more processing threads on that memory die, and broadcast an indication of the same via the peak current magnitude indicator signal HC #. As described in more detail below, during a given power management cycle, the PPM component 150 can arbitrate among the multiple processing threads on the respective memory die using one of a number of different arbitration schemes in order to allocate that peak current to enable concurrent memory access operations.

Figure 3:
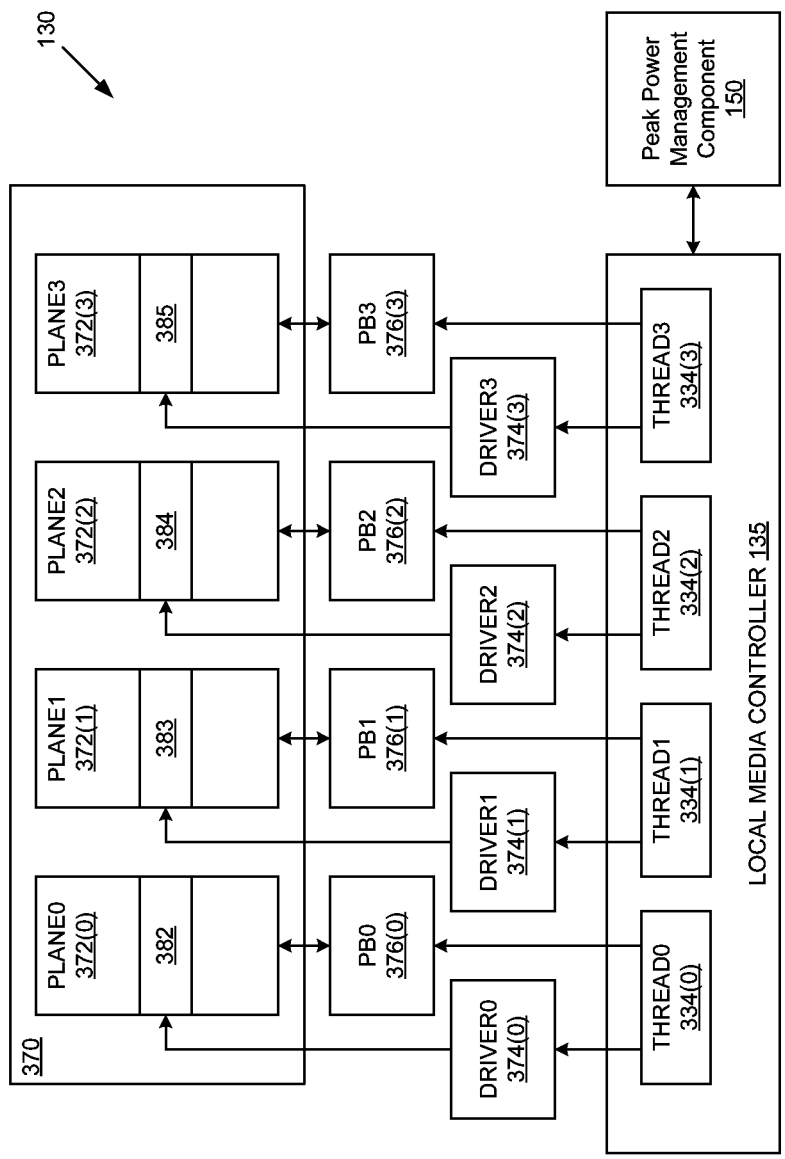
FIG. 3 is a block diagram illustrating a multi-plane memory device configured for parallel plane access in accordance with some embodiments of the present disclosure.

FIG. 3 is a block diagram illustrating a multi-plane memory device 130 configured for independent parallel plane access in accordance with some embodiments of the present disclosure. The memory planes 372(0)-372(3) can each be divided into blocks of data, with a different relative block of data from two or more of the memory planes 372(0)-372(3) concurrently accessible during memory access operations. For example, during memory access operations, two or more of data block 382 of the memory plane 372(0), data block 383 of the memory plane 372(1), data block 384 of the memory plane 372(2), and data block 385 of the memory plane 372(3) can each be accessed concurrently.

The memory device 130 includes a memory array 370 divided into memory planes 372(0)-372(3) that each includes a respective number of memory cells. The multi-plane memory device 130 can further include local media controller 135, including a power control circuit and access control circuit for concurrently performing memory access operations for different memory planes 372(0)-372(3). The memory cells can be non-volatile memory cells, such as NAND flash cells, or can generally be any type of memory cells.

The memory planes 372(0)-372(3) can each be divided into blocks of data, with a different relative block of data from each of the memory planes 372(0)-372(3) concurrently accessible during memory access operations. For example, during memory access operations, data block 382 of the memory plane 372(0), data block 383 of the memory plane 372(1), data block 384 of the memory plane 372(2), and data block 385 of the memory plane 372(3) can each be accessed concurrently.

Each of the memory planes 372(0)-372(3) can be coupled to a respective page buffer 376(0)-376(3). Each page buffer 376(0)-376(3) can be configured to provide data to or receive data from the respective memory plane 372(0)-372(3). The page buffers 376(0)-376(3) can be controlled by local media controller 135. Data received from the respective memory plane 372(0)-372(3) can be latched at the page buffers 376(0)-376(3), respectively, and retrieved by local media controller 135, and provided to the memory sub-system controller 115 via the NVMe interface.

Each of the memory planes 372(0)-372(3) can be further coupled to a respective access driver circuit 374(0)-374(3), such as an access line driver circuit. The driver circuits 374(0)-374(3) can be configured to condition a page of a respective block of an associated memory plane 372(0)-372(3) for a memory access operation, such as programming data (i.e., writing data), reading data, or erasing data. Each of the driver circuits 374(0)-374(3) can be coupled to a respective global access lines associated with a respective memory plane 372(0)-372(3). Each of the global access lines can be selectively coupled to respective local access lines within a block of a plane during a memory access operation associated with a page within the block. The driver circuits 374(0)-374(3) can be controlled based on signals from local media controller 135. Each of the driver circuits 374(0)-374(3) can include or be coupled to a respective power circuit, and can provide voltages to respective access lines based on voltages provided by the respective power circuit. The voltages provided by the power circuits can be based on signals received from local media controller 135.

The local media controller 135 can control the driver circuits 374(0)-374(3) and page buffers 376(0)-376(3) to concurrently perform memory access operations associated with each of a group of memory command and address pairs (e.g., received from memory sub-system controller 115). For example, local media controller 135 can control the driver circuits 374(0)-374(3) and page buffer 376(0)-376(3) to perform the concurrent memory access operations. Local media controller 135 can include a power control circuit that serially configures two or more of the driver circuits 374(0)-374(3) for the concurrent memory access operations, and an access control circuit configured to control two or more of the page buffers 376(0)-376(3) to sense and latch data from the respective memory planes 372(0)-372(3), or program data to the respective memory planes 372(0)-372(3) to perform the concurrent memory access operations.

In operation, local media controller 135 can receive a group of memory command and address pairs via the NVMe bus, with each pair arriving in parallel or serially. In some examples, the group of memory command and address pairs can each be associated with different respective memory planes 372(0)-372(3) of the memory array 370. The local media controller 135 can be configured to perform concurrent memory access operations (e.g., read operations or program operations) for the different memory planes 372(0)-372(3) of the memory array 370 responsive to the group of memory command and address pairs. For example, the power control circuit of local media controller 135 can serially configure, for the concurrent memory access operations based on respective page type (e.g., UP, MP, LP, XP, SLC/MLC/TLC/QLC page), the driver circuits 374(0)-374(3) for two or more memory planes 372(0)-372(3) associated with the group of memory command and address pairs. After the access line driver circuits 374(0)-374(3) have been configured, the access control circuit of local media controller 135 can concurrently control the page buffers 376(0)-376(3) to access the respective pages of each of the two or more memory planes 372(0)-372(3) associated with the group of memory command and address pairs, such as retrieving data or writing data, during the concurrent memory access operations. For example, the access control circuit can concurrently (e.g., in parallel and/or contemporaneously) control the page buffers 376(0)-376(3) to charge/discharge bitlines, sense data from the two or more memory planes 372(0)-372(3), and/or latch the data.

Based on the signals received from local media controller 135, the driver circuits 374(0)-374(3) that are coupled to the memory planes 372(0)-372(3) associated with the group of memory command and address command pairs can select blocks of memory or memory cells from the associated memory plane 372(0)-372(3), for memory operations, such as read, program, and/or erase operations. The driver circuits 374(0)-374(3) can drive different respective global access lines associated with a respective memory plane 372(0)-372(3). As an example, the driver circuit 374(0) can drive a first voltage on a first global access line associated with the memory plane 372(0), the driver circuit 374(1) can drive a second voltage on a third global access line associated with the memory plane 372(1), the driver circuit 374(2) can drive a third voltage on a seventh global access line associated with the memory plane 372(2), etc., and other voltages can be driven on each of the remaining global access lines. In some examples, pass voltages can be provided on all access lines except an access line associated with a page of a memory plane 372(0)-372(3) to be accessed. The local media controller 135, the driver circuits 374(0)-374(3) can allow different respective pages, and the page buffers 376(0)-376(3) within different respective blocks of memory cells, to be accessed concurrently. For example, a first page of a first block of a first memory plane can be accessed concurrently with a second page of a second block of a second memory plane, regardless of page type.

The page buffers 376(0)-376(3) can provide data to or receive data from the local media controller 135 during the memory access operations responsive to signals from the local media controller 135 and the respective memory planes 372(0)-372(3). The local media controller 135 can provide the received data to memory sub-system controller 115.

It will be appreciated that the memory device 130 can include more or less than four memory planes, driver circuits, and page buffers. It will also be appreciated that the respective global access lines can include 8, 16, 32, 64, 128, etc., global access lines. The local media controller 135 and the driver circuits 374(0)-374(3) can concurrently access different respective pages within different respective blocks of different memory planes when the different respective pages are of a different page type. For example, local media controller 135 can include a number of different processing threads, such as processing threads 334(0)-334(3). Each of processing threads 334(0)-334(3) can be associated with a respective one of memory planes 372(0)-372(3) and can manage operations performed on the respective plane. For example, each of processing threads 334(0)-334(3) can provide control signals to the respective one of driver circuits 374(0)-374(3) and page buffers 376(0)-376(3) to perform those memory access operations concurrently (e.g., at least partially overlapping in time). Since the processing threads 334(0)-334(3) can perform the memory access operations, each of processing threads 334(0)-334(3) can have different current requirements at different points in time. According to the techniques described herein, peak power management component 150 can determine the power budget needs of processing threads 334(0)-334(3) in a given power management cycle and identify one or more of processing threads 334(0)-334(3) using one of a number of power budget arbitration schemes described herein. The one or more processing threads 334(0)-334(3) can be determined based on an available power budget in the memory sub-system 110 during the power management cycles. For example, peak power management component 150 can determine respective priorities of processing threads 334(0)-334(3), and allocate current to processing threads 334(0)-334(3) based on the respective priorities.

Figures 4A, 4B:
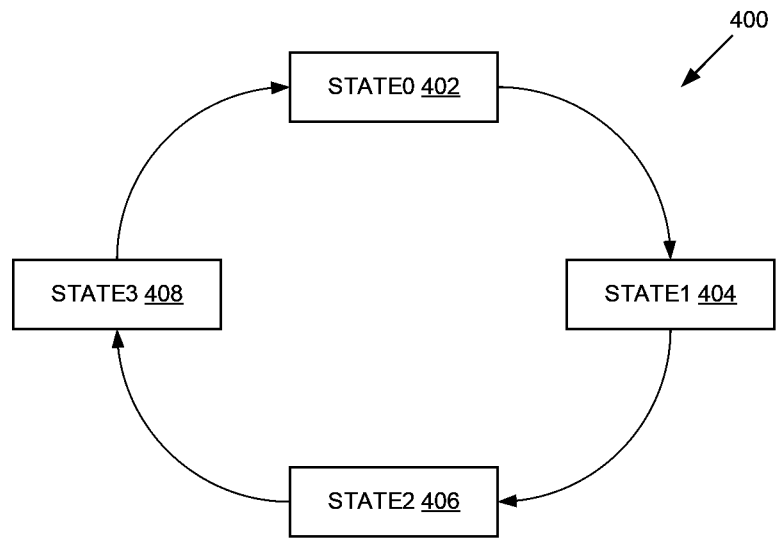
FIG. 4A is a block diagram illustrating operation of a ring counter implemented by a peak power management component of a memory device in accordance with some embodiments of the present disclosure.
FIG. 4B is a block diagram illustrating a data structure used for power budget arbitration for multiple processing threads in a memory device in accordance with some embodiments of the present disclosure.

FIG. 4A is a block diagram illustrating operation of a ring counter implemented by a peak power management component of a memory device in accordance with some embodiments of the present disclosure. In one embodiment, the ring counter 400 is formed in PPM component 150 using flip-flops, or other devices, connected into a shift register, such that the output of the last flip-flop feeds into the input of the first flip-flop, to form the circular or "ring" structure. In one embodiment, ring counter 400 is an n-bit counter representing $2^n$ different states, where $2^n$ represents the number of different processing threads, such as processing threads 334(0)-334(3) in the memory device. As illustrated in FIG. 4A, ring counter 400 is a 2-bit counter representing 4 different states (i.e., state0 402, state1 404, state2 406, and state3 408. In operation, the ring counter 400 cycles sequentially through each of the 4 states 402-408 responsive to a change in the power management cycle. For example, if ring counter 400 is initially set to state0 402, when the PPM component 150 receives the token, a value of the ring counter 400 is incremented (e.g., by 1) causing the ring counter 400 to shift to state1 404. Similarly, the next time PPM component 150 receives the token, the value is again incremented causing the ring counter to shift to state2 406, and so on. When set to state 3 408, and the value is incremented, the ring counter 400 will return to state0 402. As described in more detail below, each state of ring counter 400 is associated with one or more processing threads, thereby allowing PPM component 150 to select one or more processing threads of the memory device based on the current state of ring counter 400.

FIG. 4B is a block diagram illustrating a data structure used for power budget arbitration for multiple processing threads in a memory device in accordance with some embodiments of the present disclosure. In one embodiment, the data structure 450 is formed in or managed by PPM component 150 using a table, an array, a linked list, a record, an object, other some other data structure. In one embodiment, the data structure 450 includes a number of entries each corresponding to one of the states of ring counter 400. For example, for each state of ring counter 400, data structure 450 can identify a leading thread, and a thread combination. The leading thread can be a single processing thread having the highest priority when ring counter 400 is currently in the corresponding state, and the thread combination can be a set of two or more processing threads, but less than all of the processing threads, which have a higher priority than other threads not in the set, but a lower priority than the leading thread, when ring counter 400 is currently in the corresponding state. In one embodiment, to allocate available power budget during a power management cycle, PPM component 150 can determine a current state of ring counter 400 and determine, from data structure 450, a leading thread and a thread combination corresponding to the current state of ring counter 400. Responsive to an amount of current available in the memory sub-system during that power management cycle satisfying an amount of current associated with at least one of the leading thread or the thread combination, PPM component can request that amount of current associated with the at least one of the leading thread or the thread combination and allocated that current budget accordingly.

Figure 5:
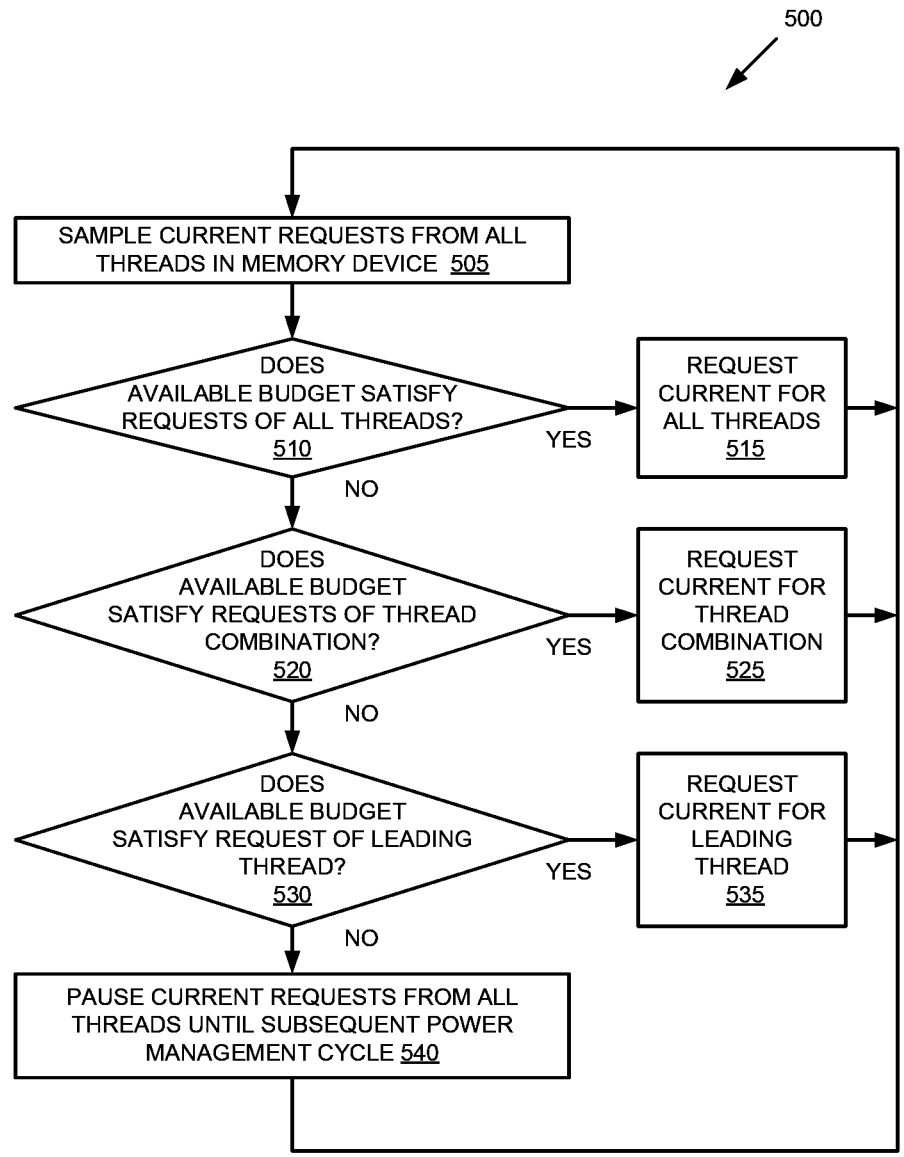
FIG. 5 is a flow diagram of an example method of power budget arbitration in a memory device using a ring counter in accordance with some embodiments of the present disclosure.

FIG. 5 is a flow diagram of an example method of power budget arbitration in a memory device using a ring counter in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by PPM component 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, power requests are sampled. For example, processing logic (e.g., PPM component 150) can sample power requests, such as current requests or peak current magnitude requests, from one or more processing threads, such as processing threads 334(0)-334(3), of a memory device. In one embodiment, responsive to the PPM component 150 receiving the token, which signals the start of a current power management cycle, PPM component 150 sends polling requests to each of the processing threads to obtain an indication of current requested during the current power management cycle. The amount of current requested can be based on a number of memory access requests pending for each processing thread and the type of memory access requests pending for each processing thread. In one embodiment, each processing threads returns a separate response to the polling request, such that PPM component 150 can determine the current request of each processing thread separately. In one embodiment, another component, or a sub-component of PPM component, such as a thread selection component can issue the polling requests to and receive the current requests from the processing threads.

At operation 510, an available power budget is determined. For example, the processing logic can determine an amount of current available in the memory device during the power management cycle. In one embodiment, the PPM component 150 receives a signal, such as peak current magnitude indicator signal HC #, indicating the current utilized by each other PPM component 150 in the multi-die package 200 and subtracts that amount from a total amount of current in the memory sub-system 110 or memory device 130. In one embodiment, the processing logic compares the total current associated with all processing threads (e.g., the sum of the individual current requests) to the amount of available current during the power management cycle to determine if the available current budget satisfies the current requests of all processing threads. If the amount of current available is equal to or greater than the amount of current associated with all of the processing threads, the processing logic determines that the amount of current available satisfies the amount of current associated with all of the processing threads.

At operation 515, current is requested and allocated. If the processing logic determines that the amount of current available satisfies the amount of current associated with all of the processing threads, the processing logic can request the amount of current associated with all of the processing threads. For example, PPM component 150 can issue the request to a common current supply or other power source in the memory device 130 or memory sub-system 110. PPM component 150 can subsequently allocate the requested current to the processing threads, allowing all of the processing threads to complete their pending memory access operations.

If the processing logic determines that the amount of current available does not satisfy the amount of current associated with all of the processing threads, at operation 520, a thread combination is examined. For example, the processing logic can identify, from a data structure, such as data structure 450, a thread combination that corresponds to a current state of a ring counter, such as ring counter 400. The thread combination corresponding to each state of ring counter 400 is different ensuring that different threads are serviced in different power management cycles and no threads are ignored. In one embodiment, the processing logic compares the total current associated with the identified thread combination (e.g., the sum of the individual current requests) to the amount of available current during the power management cycle to determine if the available current budget satisfies the current requests of the thread combination. If the amount of current available is equal to or greater than the amount of current associated with the thread combination, the processing logic determines that the amount of current available satisfies the amount of current associated with the thread combination.

At operation 525, current is requested and allocated. If the processing logic determines that the amount of current available satisfies the amount of current associated with the thread combination, the processing logic can request the amount of current associated with the thread combination. For example, PPM component 150 can issue the request to a common current supply or other power source in the memory device 130 or memory sub-system 110. PPM component 150 can subsequently allocate the requested current to the processing threads, allowing the processing threads identified in the thread combination to complete their pending memory access operations.

If the processing logic determines that the amount of current available does not satisfy the amount of current associated with the thread combination, at operation 530, a leading thread is examined. For example, the processing logic can identify, from a data structure, such as data structure 450, a leading thread that corresponds to a current state of a ring counter, such as ring counter 400. The leading thread corresponding to each state of ring counter 400 is different ensuring that different threads are serviced in different power management cycles and no threads are ignored. In one embodiment, the processing logic compares the requested current associated with the identified leading thread to the amount of available current during the power management cycle to determine if the available current budget satisfies the current request of the leading thread. If the amount of current available is equal to or greater than the amount of current associated with the leading thread, the processing logic determines that the amount of current available satisfies the amount of current associated with the leading thread.

At operation 535, current is requested and allocated. If the processing logic determines that the amount of current available satisfies the amount of current associated with the leading thread, the processing logic can request the amount of current associated with the leading thread. For example, PPM component 150 can issue the request to a common current supply or other power source in the memory device 130 or memory sub-system 110. PPM component 150 can subsequently allocate the requested current to the leading thread, allowing the leading thread to complete its pending memory access operations.

If the processing logic determines that the amount of current available does not satisfy the amount of current associated with the leading thread, at operation 540, the current requests are paused. For example, the processing logic can pause execution of the processing threads and maintain the current requests from those processing threads until a subsequent power management cycle. In the subsequent power management cycle, there can possibly be a larger amount of available current in the memory device which can be sufficient to satisfy the request associated with at least one of the processing threads.

Figure 6:
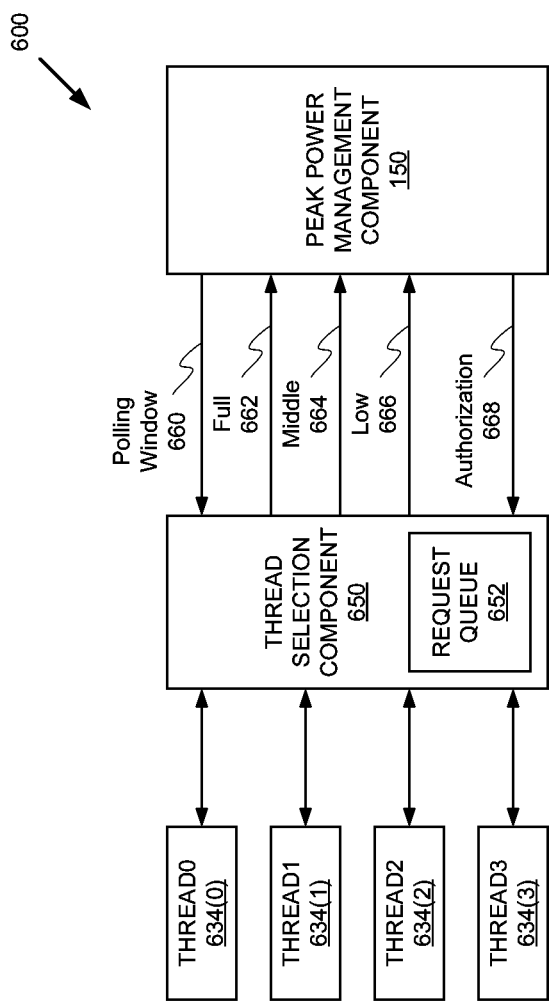
FIG. 6 is a block diagram illustrating a memory die configured for power budget arbitration for multiple processing threads in accordance with some embodiments of the present disclosure.

FIG. 6 is a block diagram illustrating a memory die configured for power budget arbitration for multiple processing threads in accordance with some embodiments of the present disclosure. In one embodiment, the memory die 600 includes control logic, such as PPM component 150 and a thread selection component 650. In one embodiment, thread selection component 650 identifies one or more processing threads, such as processing threads 634(0)-634(3) in memory die 600, and PPM component 150 determines an amount of power associated with the one or more processing threads and request that amount of power during a power management cycle.

In one embodiment, PPM component 150 periodically asserts a polling window signal 660, which is received by thread selection component 650. The polling window signal 660 is asserted after the end of a previous power management cycle (e.g., when PPM component 150 gives up the token) and prior to the beginning of a subsequent power management cycle (e.g., when PPM component 150 receives the token again). As the processing threads 634(0)-634(3) are regularly issuing requests for current depending on associated processing operations, during a period when the polling window signal 660 is asserted, thread selection component 650 stores the received requests in a request queue 652 according to the order in which the requests for current are received at thread selection component 650. In one embodiment, PPM component 650 tracks the token and can determine when the token will be received (e.g., based on synchronous clock signal ICLK) and can de-assert the polling window signal 660 in advance of that time. Responsive to the polling window signal 660 being de-asserted (i.e., during the subsequent the power management cycle), thread selection component 650 stop enqueuing additional requests in request queue 652 so that the contents of request queue 652 is static. Any new requests are not considered during this cycle, but are saved and can be considered in a subsequent token cycle. Thread selection component 650 can generate multiple current level signals, such as full signal 662, middle signal 664, and low signal 666, where each current level signal corresponds to the current associated with a respective set of at least one of the requests in the request queue 652. For example, the full signal 662 can represent the sum of all current requests in request queue 652, the middle signal 664 can represent the sum of two or more, but less than all, of the current requests in the request queue 652 (e.g., the first two or more requests in the request queue 652), and the low signal 666 can represent one current request from the request queue 652 (e.g., the first request in the request queue 652.) By polling the processing threads between power management cycles, thread selection component 650 can save significant time and processing resources compared to waiting until the token is actually received.

PPM component 150 can receive the full signal 662, middle signal 664, and low signal 666 and determine whether the amount of current associated with any these current level signals can be satisfied by an amount of current available in the memory sub-system 110 during the current power management cycle. Responsive to the amount of current available satisfying at least one of the current level signals, PPM component 150 can request that amount of current and provide an authorization signal 668 to thread selection component 650. The authorization signal 668 can indicate which of the current level signals is satisfied by the amount of available current. Thread selection component

650 can thus authorize one or more of processing threads 634(0)-634(3) to perform one or more memory access operations corresponding to the request in request queue 652 based on which requests were authorized by authorization signal 668.

Figure 7:
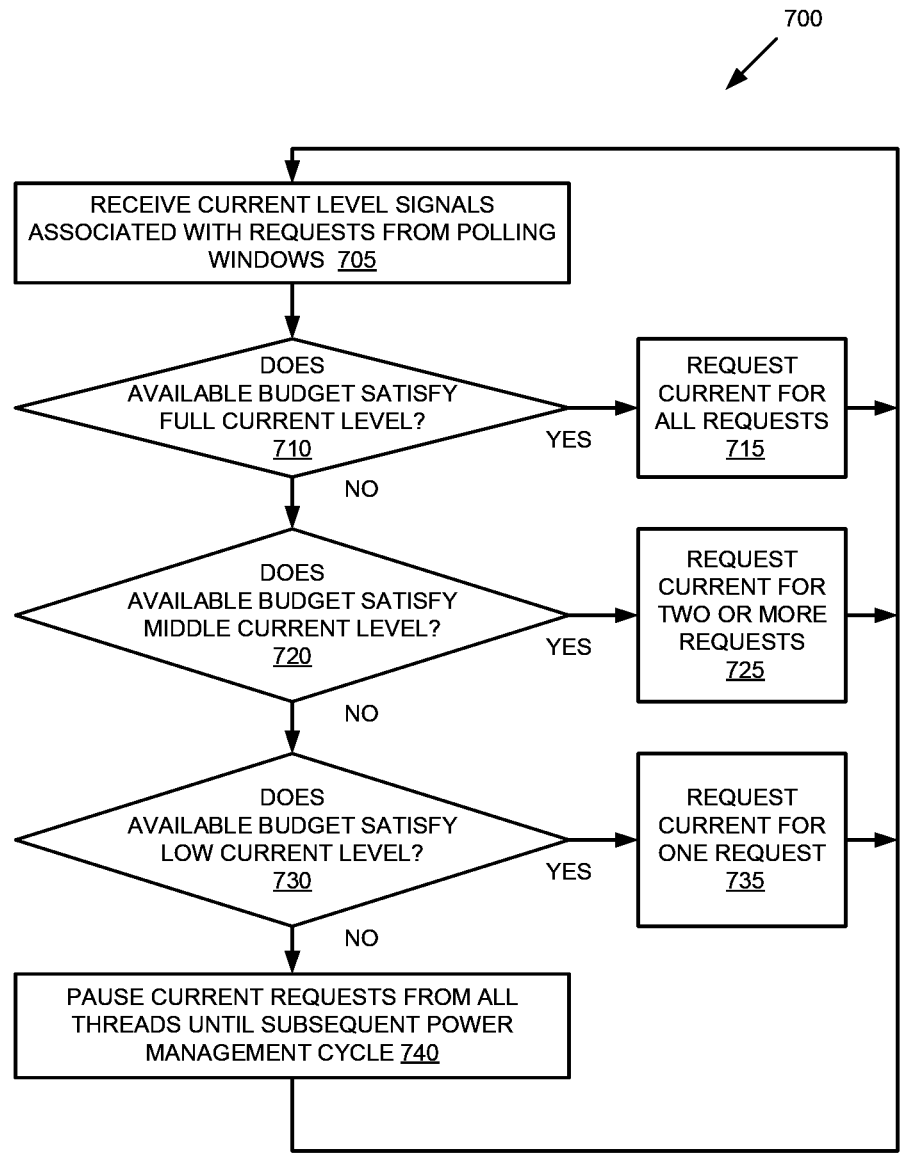
FIG. 7 is a flow diagram of an example method of power budget arbitration in a memory device using a polling window in accordance with some embodiments of the present disclosure.

FIG. 7 is a flow diagram of an example method of power budget arbitration in a memory device using a polling window in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by PPM component 150 and thread selection component 650 of FIG. 6. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 705, current level signals are received. For example, processing logic (e.g., PPM component 150) can receive one or more current level signals, such as full signal 662, middle signal 664, and low signal 666, associated with a respective set of at least one of the requests in the request queue 652. In one embodiment, the current level signals are based on requests identified during a polling window (e.g., when polling window signal 660 is asserted) between power management cycles. In one embodiment, during the polling window, thread selection component 650 receives and enqueues current request from the processing threads, with each request including an indication of current requested. The amount of current requested can be based on a number of memory access requests pending for each processing thread and the type of memory access requests pending for each processing thread. In one embodiment, each processing thread sends one or more separate requests, such that thread selection component 650 can determine the current request(s) of each processing thread separately, and add the corresponding request(s) to request queue 652.

At operation 710, an available power budget is determined. For example, the processing logic can determine an amount of current available in the memory device during the power management cycle (i.e., once the token is received and the polling window closes). In one embodiment, the PPM component 150 receives a signal, such as peak current magnitude indicator signal HC #, indicating the current utilized by each other PPM component 150 in the multi-die package 200 and subtracts that amount from a total amount of current in the memory sub-system 110 or memory device 130. In one embodiment, the processing logic compares the total current associated with the full signal 662 (e.g., the sum of all the individual current requests in request queue 652) to the amount of available current during the power management cycle to determine if the available current budget satisfies the full signal 662. If the amount of current available is equal to or greater than the amount of current associated with the full signal 662, the processing logic determines that the amount of current available satisfies the full signal 662.

At operation 715, current is requested and allocated. If the processing logic determines that the amount of current available satisfies the full signal 662, the processing logic can request the amount of current associated with all of the requests in request queue 652. For example, PPM component 150 can issue the request to a common current supply or other power source in the memory device 130 or memory sub-system 110. PPM component 150 can subsequently allocate the requested current to the processing threads via authorization signal 668, allowing all of the current requests in request queue 652 to be performed.

If the processing logic determines that the amount of current available does not satisfy full signal 662, another current level signal is examined. For example, the processing logic compares the current associated with the middle signal 664 (e.g., the sum two or more current requests in request queue 652) to the amount of available current during the power management cycle to determine if the available current budget satisfies the middle signal 664. If the amount of current available is equal to or greater than the amount of current associated with the middle signal 664, the processing logic determines that the amount of current available satisfies the middle signal 664.

At operation 725, current is requested and allocated. If the processing logic determines that the amount of current available satisfies the amount of current associated with the middle signal 664, the processing logic can request the amount of current associated with the two or more requests from request queue 652. For example, PPM component 150 can issue the request to a common current supply or other power source in the memory device 130 or memory sub-system 110. PPM component 150 can subsequently allocate the requested current to the processing threads via authorization signal 668, allowing two or more of the current requests in request queue 652 to be performed.

If the processing logic determines that the amount of current available does not satisfy the amount of current associated with the middle signal 664, at operation 730, another current level signal is examined. For example, the processing logic compares the current associated with the low signal 666 (e.g., one current request in request queue 652) to the amount of available current during the power management cycle to determine if the available current budget satisfies the low signal 666. If the amount of current available is equal to or greater than the amount of current associated with the low signal 666, the processing logic determines that the amount of current available satisfies the low signal 666.

At operation 735, current is requested and allocated. If the processing logic determines that the amount of current available satisfies the amount of current associated with the low signal 666, the processing logic can request the amount of current associated with one request from request queue 652. For example, PPM component 150 can issue the request to a common current supply or other power source in the memory device 130 or memory sub-system 110. PPM component 150 can subsequently allocate the requested current to the processing threads via authorization signal 668, allowing one current requests in request queue 652 to be performed.

If the processing logic determines that the amount of current available does not satisfy the amount of current associated with the any of the current level signals, at operation 740, the current requests are paused. For example, the processing logic can pause execution of the processing threads and maintain the current requests from those processing threads until a subsequent power management cycle. In the subsequent power management cycle, there can possibly be a larger amount of available current in the memory device which can be sufficient to satisfy at least one of the requests.

Figure 8:
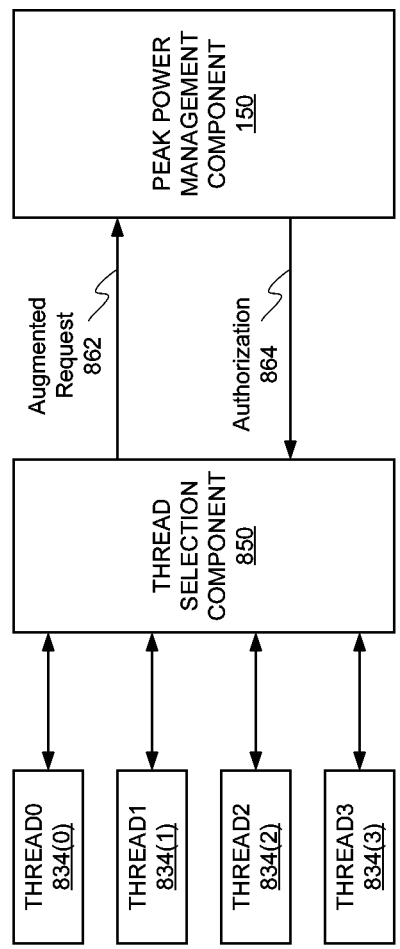
FIG. 8 is a block diagram illustrating a memory die configured for power budget arbitration for multiple processing threads in accordance with some embodiments of the present disclosure.

FIG. 8 is a block diagram illustrating a memory die configured for power budget arbitration for multiple processing threads in accordance with some embodiments of the present disclosure. In one embodiment, the memory die 800 includes control logic, such as PPM component 150 and a thread selection component 850. In one embodiment, thread selection component 850 identifies one or more processing threads, such as processing threads 834(0)-834(3) in memory die 800, and PPM component 150 determines an amount of power associated with the one or more processing threads and request that amount of power during a power management cycle.

In one embodiment, thread selection component 850 can receive one or more requests for current associated with the processing threads 834(0)-834(3). In response to receiving a request for current from at least one of the processing threads 834(0)-834(3), thread selection component 850 can generate an augmented current request 862. If the request received from one of the processing threads is for a first amount of current, thread selection component 850 can generate the augmented current request 862 for a second amount of current. In one embodiment, the second amount of current in the augmented request 862 is greater than the first amount of current by a differential amount. For example, the second amount of current can be twice the first amount of current.

PPM component 150 can receive the augmented request 862 and determine whether the second amount of current associated with the augmented request 862 can be satisfied by an amount of current available in the memory sub-system 110 during the current power management cycle. Responsive to the amount of current available satisfying the augmented request 862, PPM component 150 can request the second amount of current and provide an authorization signal 864 to thread selection component 850. The authorization signal 864 can indicate that the augmented request 862 is satisfied by the amount of available current. Thread selection component 850 can thus authorize one or more of processing threads 834(0)-834(3) to perform one or more memory access operations corresponding to the request based on the authorization signal 868. In one embodiment, the differential amount of current (i.e., the excess current from the augmented request 862 and not used for an actual request from one of the processing threads) is retained for a future request associated with a different one of the processing threads 834(0)-834(3) during the power management cycle. If the augmented request 862 is not satisfied, PPM component 150 can request the first amount of current instead of the second amount of current.

Figure 9:
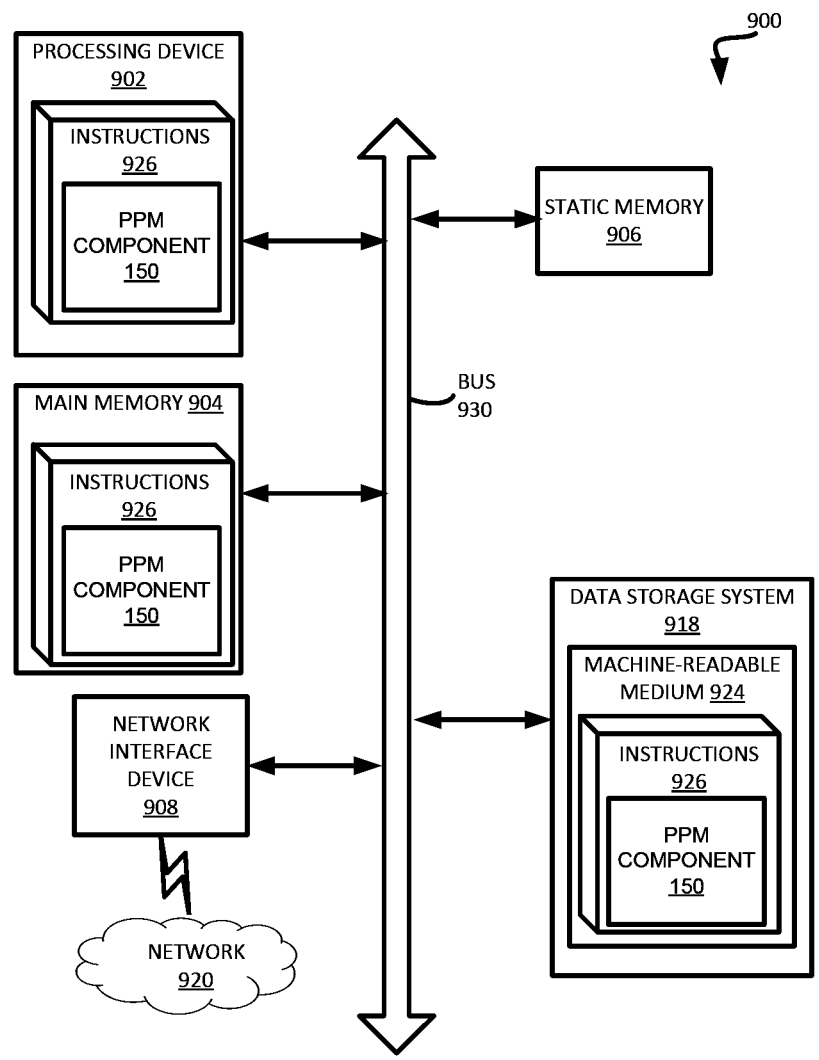
FIG. 9 is a block diagram of an example computer system in which embodiments of the present disclosure can operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to PPM component 150 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium, such as a non-transitory computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIG. 1.

In one embodiment, the instructions 926 include instructions to implement functionality corresponding to PPM component 150 of FIG. 1). While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
   a plurality of memory dies, wherein each respective memory die of the plurality of memory dies comprises:
   a memory array; and
   control logic, operatively coupled with the memory array, wherein the control logic comprises:
   a plurality of processing threads to execute memory access operations on the memory array;
   a thread selection component to identify, using a ring counter, a subset of the plurality of processing threads for a power management cycle of the respective memory die during which the respective memory die holds a power management token that periodically cycles through each of the plurality of memory dies in sequence, the subset of the plurality of processing threads comprising a leading thread corresponding to a current state of the ring counter and the subset of the plurality of processing threads comprising a thread combination corresponding to the current state of the ring counter, the leading thread comprising a single processing thread having a highest priority during the current state of the ring counter, and the thread combination comprising two or more processing threads, but less than all of the plurality of processing threads, the thread combination having a lower priority than the leading thread and a higher priority than other processing threads not in the thread combination during the current state of the ring counter; and
   a power management component to determine respective amounts of power associated with the leading thread, the thread combination, and the subset of the plurality of processing threads, determine an amount of power available in the memory device during the power management cycle, and, responsive to the amount of power available satisfying a respective amount of power associated with at least one of the leading thread, the thread combination, or the subset of the plurality of processing threads, allocate the respective amount of power to the at least one of the leading thread, the thread combination, or the subset of the plurality of processing threads during the power management cycle, and the at least one of the leading thread, the thread combination, or the subset of the plurality of processing threads to execute the memory access operations during the power management cycle.

2. The memory device of claim 1, wherein the control logic further comprises the ring counter and a data structure, wherein to identify the subset of the plurality of processing threads, the thread selection component to determine the current state of the ring counter for the power management cycle and to determine, from the data structure, the leading thread and the thread combination, from the subset of the plurality of processing threads, corresponding to the current state of the ring counter.

3. The memory device of claim 1, wherein the thread selection component is to receive a polling window signal from the power management component, and wherein:
  responsive to the polling window signal being asserted prior to the power management cycle, the thread selection component to receive one or more requests for current associated with the subset of the plurality of processing threads and store the one or more requests in a request queue; and
  responsive to the polling window signal being de-asserted during the power management cycle, the thread selection component to generate a plurality of current level signals, each of the plurality of current level signals corresponding to current associated with a respective set of at least one of the one or more requests in the request queue, and send the plurality of current level signals to the power management component.

4. The memory device of claim 3, wherein the power management component to:
  determine an amount of current available in the memory device during the power management cycle;
  determine whether the amount of current available satisfies at least one of the plurality of current level signals; and
  responsive to the amount of current available satisfying the at least one of the plurality of current level signals, request an amount of current associated with the at least one of the plurality of current level signals during the power management cycle.

5. The memory device of claim 1, wherein the thread selection component to determine a first amount of current associated with one of the subset of the plurality of processing threads and send a request for a second amount of current to the power management component, and wherein the second amount of current is greater than the first amount of current by a differential amount.

6. The memory device of claim 5, wherein the power management component to:
  determine an amount of current available in the memory device during the power management cycle;
  determine whether the amount of current available satisfies the second amount of current; and
  responsive to the amount of current available satisfying the second amount of current, request the second amount of current during the power management cycle, wherein the differential amount of current is retained for a future request associated with a different one of the subset of the plurality of processing threads during the power management cycle.

7. A memory device comprising:
  a memory array; and
  control logic, operatively coupled with the memory array, to perform operations comprising:
    scheduling, across a plurality of processing threads executed by the control logic, a plurality of memory access operations on the memory array;
    receiving a power management token associated with a power management cycle of the memory device, wherein the power management token periodically cycles through each of a plurality of memory devices in sequence, the plurality of memory devices comprising the memory device;
    identifying, using a ring counter, a subset of the plurality of processing threads for the power management cycle, the subset of the plurality of processing threads comprising a leading thread corresponding to a current state of the ring counter and the subset of the plurality of processing threads comprising a thread combination corresponding to the current state of the ring counter, the leading thread comprising a single processing thread having a highest priority during the current state of the ring counter, and the thread combination comprising two or more processing threads, but less than all of the plurality of processing threads, the thread combination having a lower priority than the leading thread and a higher priority than other processing threads not in the thread combination during the current state of the ring counter;
    determining respective amounts of power associated with the leading thread, the thread combination, and the subset of the plurality of processing threads, determine an amount of power available in the memory device during the power management cycle; and
    responsive to the amount of power available satisfying a respective amount of power associated with at least one of the leading thread, the thread combination, or the subset of the plurality of processing threads, allocating the respective amount of power to the at least one of the leading thread, the thread combination, or the subset of the plurality of processing threads during the power management cycle, and the at least one of the leading thread, the thread combination, or the subset of the plurality of processing threads to execute the plurality of memory access operations during the power management cycle.

8. The memory device of claim 7, wherein identifying the subset of the plurality of processing threads comprises determining the current state of the ring counter for the power management cycle and determining, from a data structure, the leading thread and the thread combination, from the subset of the plurality of processing threads, corresponding to the current state of the ring counter.

9. The memory device of claim 7, wherein the control logic to perform operations further comprising:
  identifying a polling window;
  responsive to the polling window being opened prior to the power management cycle, receiving one or more requests for current associated with the subset of the plurality of processing threads and storing the one or more requests in a request queue; and
  responsive to the polling window being closed during the power management cycle, generating a plurality of current level signals, each of the plurality of current level signals corresponding to current associated with a respective set of at least one of the one or more requests in the request queue.

10. The memory device of claim 9, wherein the control logic to perform operations further comprising:
  determining an amount of current available in the memory device during the power management cycle;
  determining whether the amount of current available satisfies at least one of the plurality of current level signals; and
  responsive to the amount of current available satisfying the at least one of the plurality of current level signals, allocating an amount of current associated with the at least one of the plurality of current level signals during the power management cycle.

11. The memory device of claim 7, wherein the control logic to perform operations further comprising:
  determining a first amount of current associated with one of the subset of the plurality of processing threads; and sending a request for a second amount of current to a power management component, wherein the second amount of current is greater than the first amount of current by a differential amount.

12. The memory device of claim 11, wherein the control logic to perform operations further comprising:
determining an amount of current available in the memory device during the power management cycle;
determining whether the amount of current available satisfies the second amount of current; and
responsive to the amount of current available satisfying the second amount of current, allocating the second amount of current during the power management cycle, wherein the differential amount of current is retained for a future request associated with a different one of the subset of the plurality of processing threads during the power management cycle.

13. A method comprising:
scheduling, across a plurality of processing threads executed by a control logic, a plurality of memory access operations on a memory array;
receiving a power management token associated with a power management cycle of a memory device, wherein the power management token periodically cycles through each of a plurality of memory devices in sequence, the plurality of memory devices comprising the memory device;
identifying, using a ring counter, a subset of the plurality of processing threads for the power management cycle, the subset of the plurality of processing threads comprising a leading thread corresponding to a current state of the ring counter and the subset of the plurality of processing threads comprising a thread combination corresponding to the current state of the ring counter, the leading thread comprising a single processing thread having a highest priority during the current state of the ring counter, and the thread combination comprising two or more processing threads, but less than all of the plurality of processing threads, the thread combination having a lower priority than the leading thread and a higher priority than other processing threads not in the thread combination during the current state of the ring counter;
determining respective amounts of power associated with the leading thread, the thread combination, and the subset of the plurality of processing threads, determine an amount of power available in the memory device during the power management cycle; and
responsive to the amount of power available satisfying a respective amount of power associated with at least one of the leading thread, the thread combination, or the subset of the plurality of processing threads, allocating the respective amount of power to the at least one of the leading thread, the thread combination, or the subset of the plurality of processing threads during the power management cycle, and the at least one of the leading thread, the thread combination, or the subset of the plurality of processing threads to execute the plurality of memory access operations during the power management cycle.

14. The method of claim 13, wherein identifying the subset of the plurality of processing threads comprises determining the current state of the ring counter for the power management cycle and determining, from a data structure, the leading thread and the thread combination, from the subset of the plurality of processing threads, corresponding to the current state of the ring counter.

15. The method of claim 13, wherein identifying the subset of the plurality of processing threads comprises:
identifying a polling window;
responsive to the polling window being opened prior to the power management cycle, receiving one or more requests for current associated with the subset of the plurality of processing threads and storing the one or more requests in a request queue; and
responsive to the polling window being closed during the power management cycle, generating a plurality of current level signals, each of the plurality of current level signals corresponding to a current associated with a respective set of at least one of the one or more requests in the request queue.

16. The method of claim 15, further comprising:
determining an amount of current available in the memory device during the power management cycle;
determining whether the amount of current available satisfies at least one of the plurality of current level signals; and
responsive to the amount of current available satisfying at least one of the plurality of current level signals, allocating an amount of current associated with the at least one of the plurality of current level signals during the power management cycle.

17. The method of claim 13, further comprising:
determining a first amount of current associated with one of the subset of the plurality of processing threads;
sending a request for a second amount of current to a power management component, wherein the second amount of current is greater than the first amount of current by a differential amount;
determining an amount of current available in the memory device during the power management cycle;
determining whether the amount of current available satisfies the second amount of current; and
responsive to the amount of current available satisfying the second amount of current, allocating the second amount of current during the power management cycle, wherein the differential amount of current is retained for a future request associated with a different one of the subset of the plurality of processing threads during the power management cycle.

* * * * *